United States Patent
King

(10) Patent No.: US 6,922,039 B2
(45) Date of Patent: Jul. 26, 2005

(54) DYNAMIC CONTROL TIMER CIRCUIT AND METHOD

(75) Inventor: Ken Richard King, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 190 days.

(21) Appl. No.: 10/624,418

(22) Filed: Jul. 22, 2003

(65) Prior Publication Data
US 2005/0017270 A1 Jan. 27, 2005

(51) Int. Cl.[7] .................................................. H02J 7/00

(52) U.S. Cl. ...................................................... 320/133

(58) Field of Search ......................... 320/133; 324/426, 324/427; 307/31, 39, 85

(56) References Cited

U.S. PATENT DOCUMENTS 6,259,254 B1 * 7/2001 Klang ........................ 324/427
6,437,574 B1 * 8/2002 Robinson et al. ........... 324/426

* cited by examiner

Primary Examiner—Pia Tibbits
(74) Attorney, Agent, or Firm—W. Daniel Swayze, Jr.; W. James Brady; Frederick J. Telecky, Jr.

(57) ABSTRACT

The present invention comprises a circuit and method for controlling current to a load. In an exemplary embodiment, the circuit makes the maximum charge time ("MCT") of a battery charging circuit (100) a function of the charging current. The MCT changes as the battery charging current changes. For low current the MCT would increase and for high current the MCT would decrease. The result is that MCT will always occur a short time after the battery is fully charged. In operation, the charging current can also be made a function of the temperature of devices within the charging circuit.

46 Claims, 3 Drawing Sheets

DYNAMIC CONTROL TIMER CIRCUIT AND METHOD

FIELD OF THE INVENTION

The present invention generally relates to battery charger circuits, including circuits designed to manage power dissipation and to control charging current.

BACKGROUND OF THE INVENTION

Advances in technology have allowed a variety of electronic devices, including laptop computers, personal digital assistants ("PDAs"), digital audio and compact disk players, to continue to be reduced in size. In addition, the battery chargers used to charge internal batteries used in these devices have also been reduced in size. As battery charger products become smaller, the challenges in managing heat dissipation have increased. Techniques that dynamically limit the amount of power in the battery charging circuit are well known in the art. Also, most battery charging techniques include a fixed parameter, maximum charge time ("MCT") that is used to terminate the charge operation upon the expiration of a fixed time period.

Charger circuits typically include one or a plurality of a power transistor through which charging currents are regulated by various techniques such as a pulse width modulated ("PWM") or linear feedback signals applied to the gates thereof. Further, as referenced above, for safety purposes, charger circuits typically include a timer to shut off the charger after the predetermined amount of time, MCT. For example, if a designer is tasked with designing a circuit to charge a one amp-hour battery, the designer must assume that the circuit will take one hour to fully charge a discharged one amp-hour battery when charged at a one amp rate. Assuming the charging circuit is able to dissipate heat during the charge, the designer would set the timer's MCT such that the timer would operate to shut off the charger after about one hour.

However, battery charge times vary based on different conditions. For example, the battery charging current may increase or decrease based upon available power, or the charging current may decrease if the system temperature reaches an excessive level. Alternatively, the user may desire different charging currents based on other criteria such as avoiding peak power costs, or the user may decide to sacrifice battery life for a shorter charging time. In such cases, the charge rate on the battery is dynamically varied through regulation of the charger's power transistor.

While conventional battery charging circuits are operable to dynamically vary the charging process, disadvantageously MCT remains static or fixed. While the designer can take into account the variations in charging currents when setting MCT, MCT is still a fixed parameter which, in conventional circuits, cannot be optimized on the fly based on the charging currents. Typically, MCT of conventional battery chargers are determined based on fixed input voltages, input power levels and operating temperatures. This limits the utility of MCT when the operation of the battery charger is outside the predetermined, fixed parameters.

Inasmuch as conventional battery charging circuits are not operable to dynamically adjust MCT, MCT is typically set for a very long duration and operates solely to insure that the battery is fully charged. Disadvantageously, overly long charging times can be dangerous and tend to defeat the safety purposes of having an MCT. Alternatively, if the maximum charging time is too short, then the battery will not be fully charged resulting in poor charger performance. In battery charging applications where the charging current is not fixed or can vary, MCT must be set for worst case, which it typically based on lowest charging current rate resulting in very long, unsafe MCTs.

SUMMARY OF THE INVENTION

The present invention comprises a circuit operable to dynamically adjust and optimize MCT based on charging conditions over the duration of the charge. These conditions can include, among other things, condition or status of the battery being charged, condition or status of a load, or the temperature of circuit devices. While similar to conventional charger circuits that are operable to dynamically adjust the rate of the charging current as dictated by operating conditions, the present invention advantageously is also operable to dynamically adjust MCT over the duration of the charge.

The present invention operates by making MCT a function of the charging current. MCT changes as the conditions change, such as when battery charging current changes. During low current operation of the battery charger, MCT increases and during high current operation of the battery charger, MCT decreases. In any event, MCT will always occur, and thus the charge operation will be terminated, a short time after the battery is fully charged or when, in the absence of abnormalities, should be fully charged.

More specifically, if the charging current rate is dynamically reduced because the temperature of the power transistor is increasing, the current delivered to a current controlled oscillator that controls MCT is reduced proportionally. In conjunction therewith, MCT will be increased proportionally. If the charging current is reduced by a factor of two, the timer will automatically double the duration of MCT. If a battery is not fully charged upon reaching MCT, which could be an indication of a battery abnormality, MCT nevertheless causes the charger to turn off. In this mode of operation, the safety feature of the timer circuit continues to operate. In effect, the circuit of the present invention is operable to dynamically manage the current, and in conjunction therewith, dynamically manage the timer that controls the duration of MCT.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
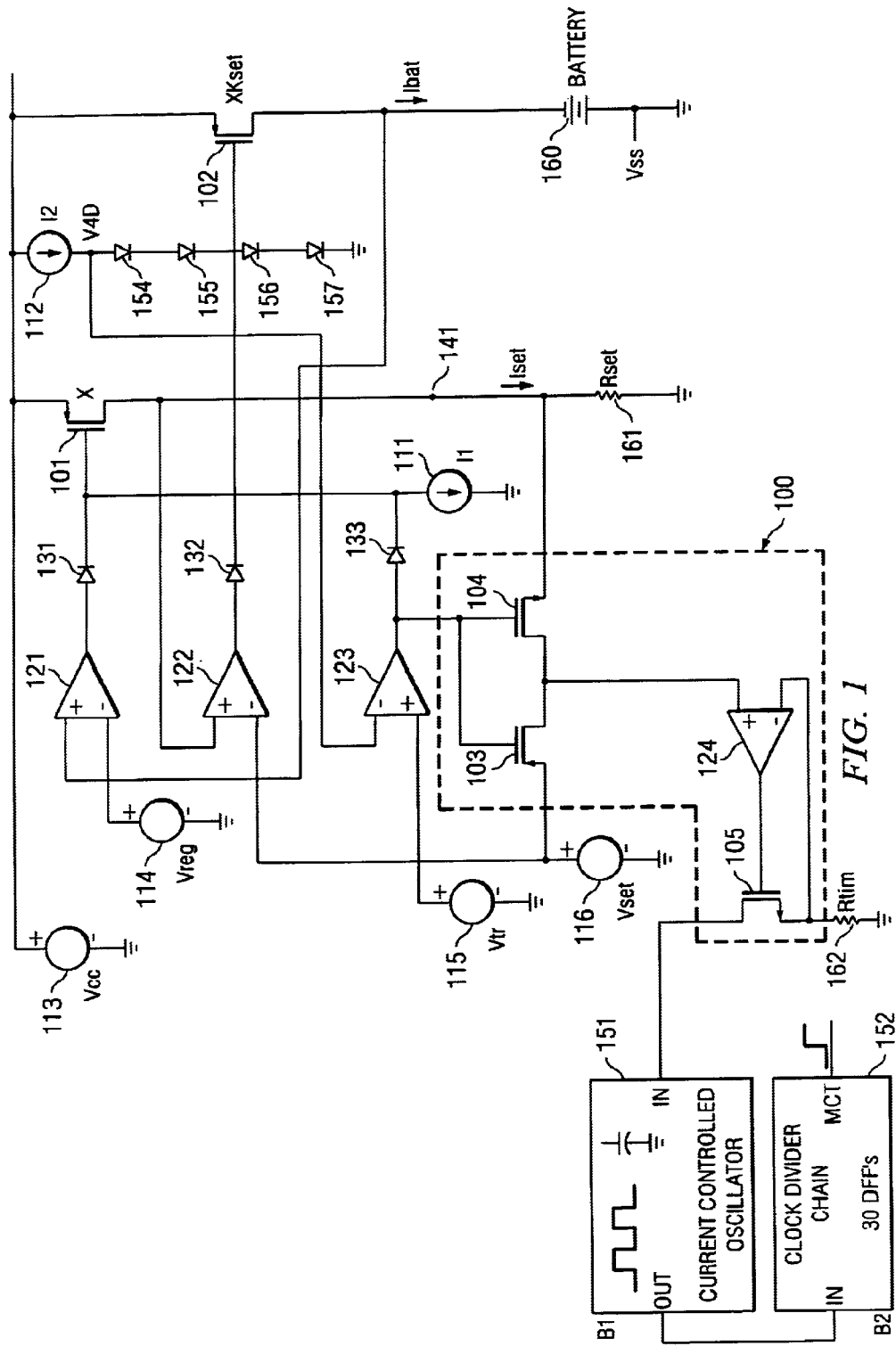
FIG. 1 is a schematic diagram of an embodiment of the present invention.

The numerous innovative teachings of the present invention will be described with particular reference to an exemplary embodiment of a battery charging circuit. However, it should be understood that this exemplary embodiment provides only one example of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity. For purposes of describing the operation of the present invention, the output impedance of all transistors is assumed to be infinite and all the diodes are silicon type with a room temperature voltage of 0.7 volts and a temperature coefficient of −2.0 mV per degree Celsius. In addition, in order to more fully understand the operation of the present invention, the circuit designed to implement it is described from different vantage points.

An exemplary embodiment of the present invention is operable to allow the charging of a normal battery to full capacity when charging currents or charging parameters are dynamic, while at the same time dynamically adjusting MCT to its optimal value. Among other things, the present invention facilitates the safe operation of the battery charger at a variety of static and dynamic supply voltages and temperatures and in situations where input power varies.

As seen in FIG. 1, current 11 at current source 111, operates to pull the gates of MOS transistors 101 and 102 down. This pull down current gradually turns on these transistors, until amplifiers 121, 122 and 123 begin to pull up on the gates of MOS transistors 101 and 102 via diodes 131, 132, and 133 at their respective outputs. Current 12 at current source 112 is used to bias diodes 154, 155, 156 and 157 thus establishing voltage V4D at the anode of diode 154. This voltage, V4D, is used to monitor the temperature of MOS transistor 102. Circuit block 151 is a current controlled oscillator. Block 151 outputs a 50% duty cycle square wave that is proportional to the current pulled from its input. Circuit block 152 is a clock divider chain of D-type flip-flops used to divide down the frequency of its input. The actual number of flip-flops can be varied to vary the frequency of the input. The number of flip-flops in, and the input frequency to, circuit block 152 sets the time at which its output, which determines MCT, transitions from low to high. The transition of MCT from low to high occurs when MCT has been reached, thus enabling a termination circuit to terminate the charge current. The circuit and method for dynamically adjusting MCT and regulating the temperature of the transistor(s) that control charging currents to a battery under charge comprise the present invention.

To further illustrate the operation of the present invention, at lower, or normal temperatures, the battery 160 is charged by MOS transistor 102 with either a constant current or constant voltage. In constant current ("CC") mode the battery voltage is below Vreg 114 and amplifier 122 controls the gate voltage of MOS transistor 102 such that the current in MOS transistor 102, which is also the battery current, is:

Kset*Vset/Rset.

As battery 160 charges, the voltage across it will increase. In constant voltage ("CV") mode, once battery voltage has reached Vreg 114, amplifier 121 will be controlling the gate voltage of MOS transistor 102. This constant voltage will be applied to the battery until MCT is reached and, at that time, the MCT pin on circuit block 152 will transition from low to high. When MCT transitions from low to high, external control circuitry (not shown) reverses the polarity of current 11 thus turning off MOS transistors 101 and 102, terminating the battery charging process.

In high temperature operation, MOS transistor 102, which is integrated with the rest of the circuitry shown in FIG. 1, is operable to dissipate a considerable amount of power. This power dissipation causes the temperature of MOS transistor 102 to rise. If the power dissipation is sufficient to increase the temperature of MOS transistor 102 such that voltage V4D becomes equal to Vtr 115, amplifier 123 will begin to control the gate voltage of MOS transistor 102. Voltage V4D will decrease as the temperature of MOS transistor 102 increases due to the temperature coefficient of diodes 154, 155, 156 and 157. The resulting output current will be such that the power dissipated by MOS transistor 102 will maintain the temperature thereof at a fixed value. The number of diodes used to measure the temperature of MOS transistor 102, in the disclosed embodiment is shown as four with the voltage Vtr 115 setting the fixed temperature value.

As can be seen, reducing the output current regulates the power dissipation, and hence, the resulting temperature of MOS transistor 102. As the output current is reduced, the voltage across resistor 161 is also reduced. When the temperature of MOS transistor 102 is being regulated the voltage across resistor 162 is the same as resistor 161. As the voltage across resistor 162 is reduced, the current operating the oscillator in circuit block 151 is also reduced, causing the oscillator within control block 151 to slow down. The slowing of the oscillator within control block 151 effectively acts to increase the duration of MCT. An increase in the duration of MCT is necessary when the temperature of MOS transistor 102 is being reduced. The charging current is reduced from its normal level, the normal level being determined by the value of resistor 161. The increase in duration of MCT is proportional to the amount of reduction in the charging current. As such, the timer that determines MCT is under dynamic control. The dynamic control of MCT is dependent upon, among other things, the power dissipation occurring in MOS transistor 102 and the ambient temperature and the power dissipation capability of the assembly containing MOS transistor 102.

MOS transistor 101 is a small version of a power MOS transistor, and it is connected essentially in parallel with MOS transistor 102, except for the drains. In this manner, it is similar to a current mirror, with the current through MOS transistor 101 being referred to as X and the current through MOS transistor 102 being referred to as X times Kset. Kset is a typically a large number. If the current through MOS transistor 102 is 1 amp and Kset is 1,000, then the current X is 1 milliamp through MOS transistor 101.

The current regulation loop of the circuit of FIG. 1 operates as follows: resistor 161 is chosen such that a voltage is developed at node Iset 141. Between the value of Vset 116, Iset 141 and the value Rset of resistor 161, the current through Iset can be set by the user as resistor 161 is an external element. If the user desires Vset divided by Rset to be 1 milliamp, the charge current will be 1 amp for Kset=1000. Amplifier 122 regulates the maximum charging current.

Circuit 100 comprises the dynamic MCT implementation circuit. As seen therein, transistor 103 is on when amplifier 123 is not controlling the gate voltage of MOS transistor 102. Transistor 104 is on when amplifier 123 is controlling the gate voltage of MOS transistor 102. The current in transistor 101 is always a fraction, 1/Kset, of that flowing in MOS transistor 102. This occurs because MOS transistor 102 is Kset times larger than transistor 101 and both of these transistors have the same gate to source voltage. Amplifier 124 is used to impress the voltage Vset or the voltage across resistor 161 upon resistor 162 depending upon which transistor, 103 or 104, is on. The voltage across resistor 162 sets the current that operates the oscillator in circuit block 151.

Referring further to FIG. 1, in normal operation and as noted, current source 111 tends to pull down on the gates of MOS transistors 101 and 102. Further, as noted, one of the three amplifiers 121, 122 or 123 operate to override the pull down effect of current source 111. So when the battery voltage Vbat goes above Vreg, the circuit tends to turn the transistors off. When the charge current exceeds Kset*Vset/Rset the circuit tends to turn the transistor off. When the temperature of transistor 102 rises to the set point the circuit tends to turn the transistor off. Finally when signal MCT changes to an active state current 111 reverses polarity and the gates of MOS transistors 101 and 102 go to the rail turning the transistors off, and the charge is terminated.

The bulk of power dissipation occurs in MOS transistor 102. When the temperature of MOS transistor 102 is in or below the normal temperature operating range, amplifier 123 is not controlling the gates of MOS transistors 101 and 102, so its output is low. If the output is low, MOS transistor 103, which is shown as a p-channel device in the disclosed embodiment, turns on and the voltage Vset 116 is applied through amplifier 124 to establish a current in MOS transistor 105 and that current through MOS transistor 105 establishes a base frequency for the internal oscillator in circuit block 151 which acts to adjust the timer that controls MCT. In this scenario, there are no thermal conditions of concern as MOS transistor 102 is not above its normal operating temperature range. The voltage Vset 116 is applied across resistor 162 to establish a current through MOS transistor 105 which is controlled by amplifier 124. If the power dissipation causes MOS transistor 102 to increase in temperature above its normal operating range, diodes, 154, 155, 156 and 157, and current source 112 establish voltage V4D at node 142. The diodes each have a negative temperature co-efficient of about −2 millivolts per degree Celsius, typical of a silicon diode junction, although other diodes or temperature sensing components with other temperature coefficients can be utilized in the present invention. Thus, as MOS transistor 102 increases in temperature, voltage V4D will decrease. Vtr 115, which is the temperature regulation voltage, is set such that when the MOS transistor 102 reaches a target temperature, for example, 125 degrees Celsius, then voltage V4D will equal voltage Vtr, and amplifier 123 will begin to control the current. Amplifier 123 will begin to throttle back and pull up the gates of MOS transistors 101 and 102 overriding both the voltage regulation loop of amplifier 121 and the current regulation loop of amplifier 122. Thus, when the temperature increases, voltage V4D voltage drops down, amplifier 123 takes over and pulls the gate of MOS transistors 101 and 102 up through diode 133, pulling up on the current source 111. At the same time, a logic transition occurs, because the output of amplifier 123, i.e., the anode side of diode 133, goes high.

As soon as temperature control is assumed, the reference voltage for amplifier 124 switches from Vset over to the voltage that is on resistor 161 and that handoff occurs when the output of amplifier 123 transitions from a low voltage to a high voltage and begins to control the current through transistor 102. When amplifier 123 begins to control the gates of transistors 101 and 102, transistor 103 turns off and transistor 104 turns on. This switches the reference point over to the top side of resistor 161, as opposed to Vset 116. Prior to the switch point, the two voltages are the same, as amplifier 123 is controlling the voltage on resistor 161 to Vset 116. The handoff point occurs when the two voltages are approximately equal. As the temperature begins to be regulated, the current Ichg decreases so the voltage on resistor 161 begins to decrease and therefore, the current through transistor 105 begins to decrease. In response thereto, the oscillator of current block 151 proportionally slows down. As noted, circuit block 151 contains a high frequency oscillator. In order to get the frequency in terms of hours for realistic charging times, a number of D flip-flops contained in circuit block 152 are implemented as a clock divider chain.

The operation of the present invention is further illustrated in that if MOS transistor 102 begins to increase in temperature, diodes 154, 155, 156 and 157 will sense the temperature increase and the voltage V4D will begin to decrease. In such event, amplifier 123 then takes over and when it does, transistors 103 and 104 transition. The frequency of the oscillator will begin to run at a rate proportional to the voltage on the top side of resistor 161. Because the voltage on resistor 161 is always proportional to the charging current, the oscillator of circuit 151 slows down accordingly. The oscillator frequency directly translates to time and hence to MCT. MCT is a time integral of the oscillator frequency.

As can thus be seen, circuit 100 of FIG. 1 implements the dynamic MCT implementation circuit of the present invention. As seen therein, transistor 103 is on when amplifier 123 is not controlling the gate voltage of MOS transistor 102. Transistor 104 is on when amplifier 123 is controlling the gate voltage of MOS transistor 102. The current in transistor 101 is always a fraction, 1/Kset, of that flowing in MOS transistor 102. This occurs because MOS transistor 102 is Kset times larger than transistor 101 and both of these transistors have the same gate to source voltage. Amplifier 124 is used to impress the voltage Vset or the voltage across resistor 161 upon resistor 162 depending upon which transistor, 103 or 104, is on. The voltage across resistor 162 sets the current that operates the oscillator in circuit block 151.

Figure 2:
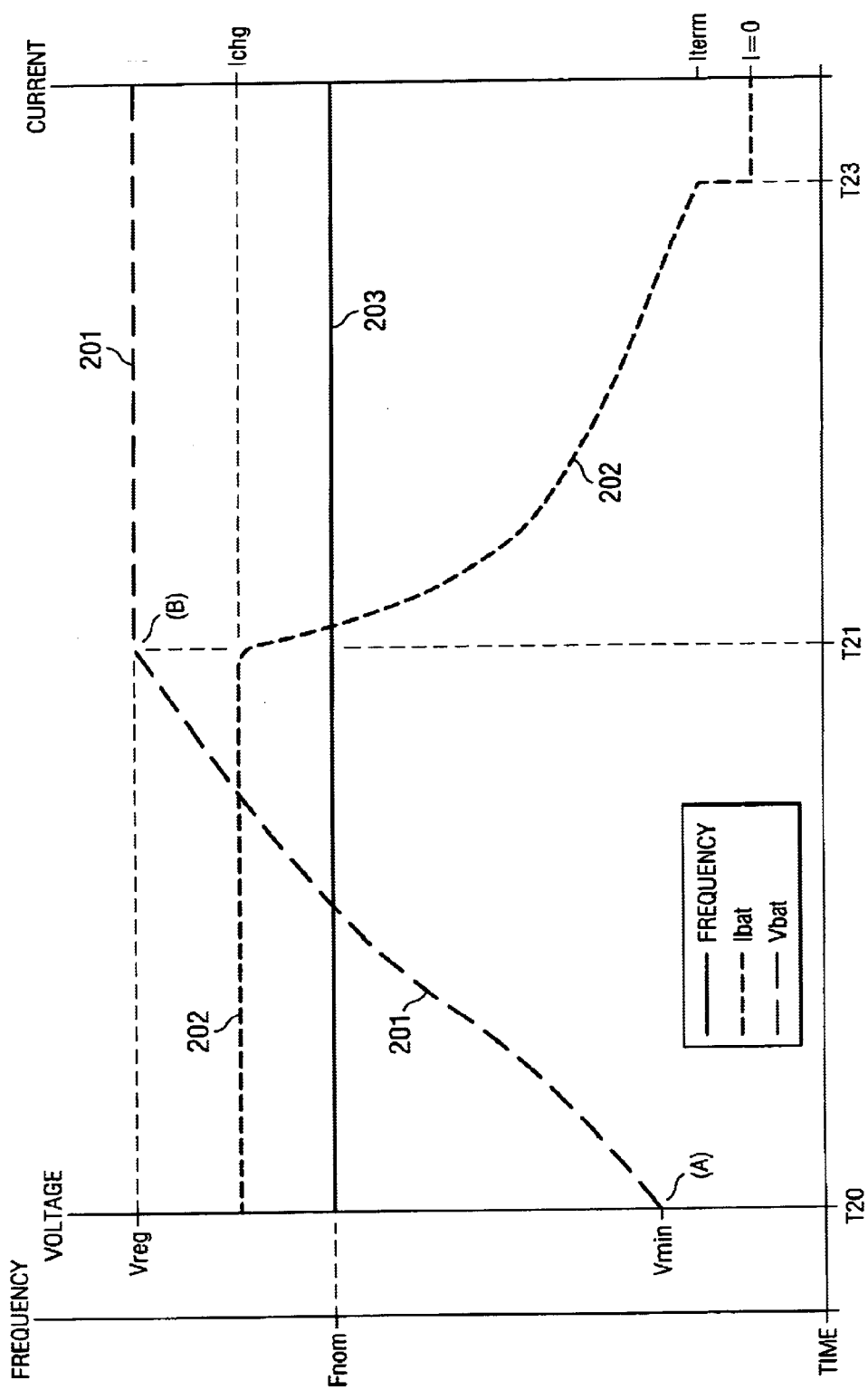
FIG. 2 is a graph of a conventional charger without varying charge rates and without a dynamic timer.
Figure 3:
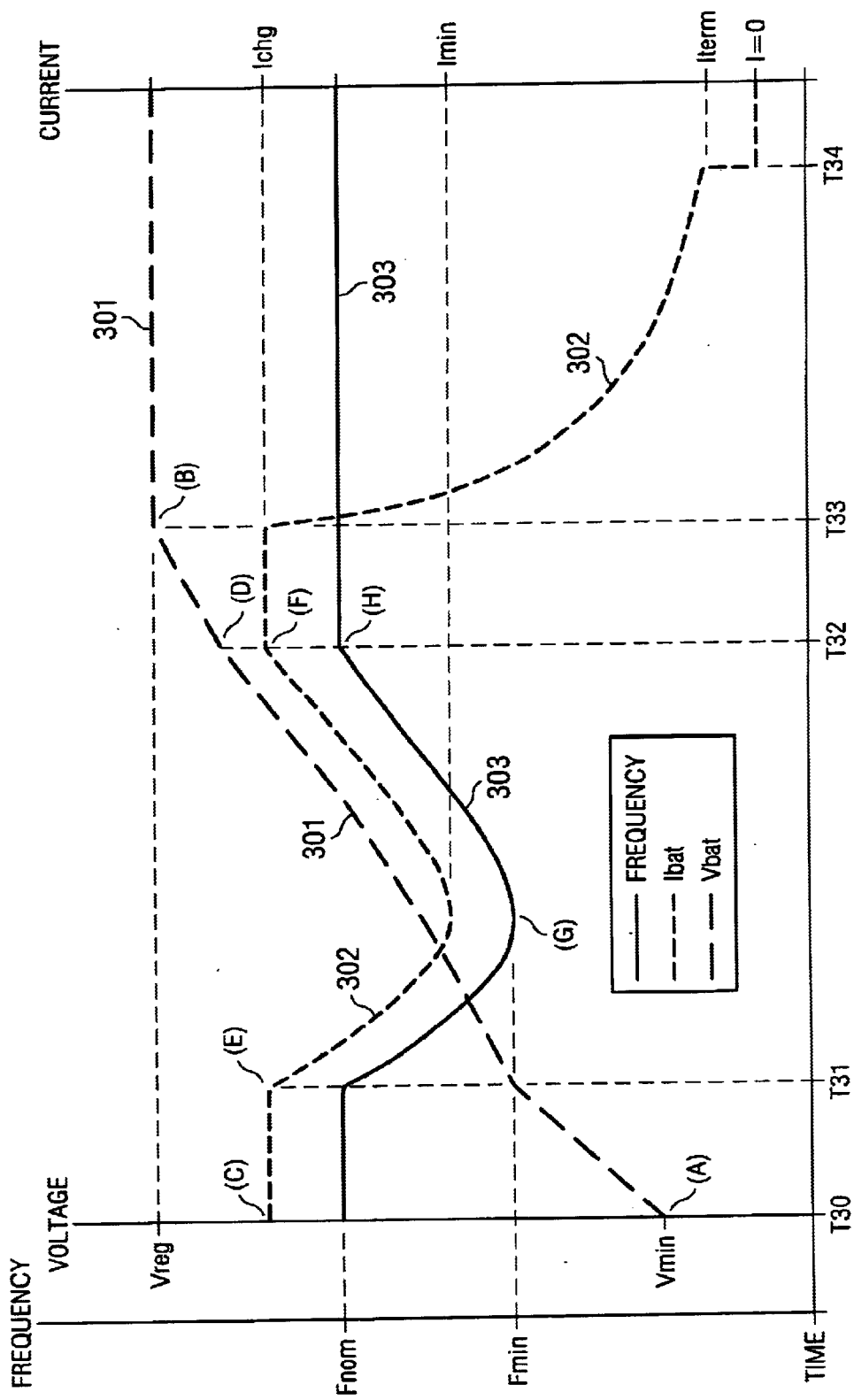
FIG. 3 is a graph that illustrates the battery charging process for the battery charging circuit of the present invention with a dynamic timer.

FIGS. 2 and 3 graphically illustrate the operation of the conventional battery charging circuit and the battery charging circuit of the present invention. FIG. 2 is a graph of a conventional charger without varying charge rates and without a dynamic timer and uses a fixed maximum charge rate of Ichg amps using an oscillator that runs at a constant frequency of Fnom hertz where MCT is obtained using the time integral thereof. Trace 203 is the oscillator frequency, trace 202 is the charging current and trace 201 is the battery voltage. In operation, the conventional battery charger circuit and the battery charging circuit of the present invention both have a voltage regulation and a current regulation loop. The current regulation loop is operable to pull back on the current the maximum charging current is reached. FIG. 2 is a rough illustration of Vbat and Ichg at a normal charge rate with an oscillator frequency of Fnom Hz. FIG. 2 is the battery charging profile of the conventional battery charging circuit with the first left y-axis representing oscillator frequency, the second left y-axis representing battery voltage and the right y-axis representing charging current.

Referring to FIG. 2, in normal operation with a constant oscillator frequency of Fnom Hz, battery current Ibat, seen as line 202, and battery voltage Vbat, seen as the line 201, are flat and rising respectively in the CC interval T20 to T21. During the CV interval T21 to T23, battery current Ibat and battery voltage Vbat are falling and flat respectively. The actual charge time is the integral of the fixed oscillator frequency.

Referring to FIG. 2, regulated operation of a conventional charging circuit is graphically illustrated. As seen therein, current Ichg is seen at the source of MOS transistor 102. Ichg is equal to $$\frac{Kset \cdot Vset}{Rset}$$

during the CC interval. As seen in FIG. 2, the battery current Ibat 202 starts off as a flatline, until voltage regulation commences. Battery voltage Vbat 201 starts to ramp up during charging, as would be anticipated during normal operation. And when it gets to Vreg at time T21, voltage regulation takes over. Vbat 201 goes flat and the current Ibat 202 begins to taper down to some small value as the battery gets full. When it is anticipated to be at a very small value the timer will terminate the charging operation, regardless of the actual state of the battery or other charging parameters.

As further seen in FIG. 2, battery voltage Vbat is low at point A. Because it starts off low, the conventional circuit starts charging at a fixed charge current, the current being set by the large power transistor, typically a MOS transistor such as MOS transistor 102 in FIG. 1. When the battery voltage Vbat is low, and the current is at Ichg, the power dissipation is the voltage across MOS transistor 102×Ichg, which is $$\frac{Vcc - Vbat}{Ichg}.$$

FIG. 3 is a graph that illustrates the battery charging process for the battery charging circuit of the present invention with a dynamic timer. Trace 301 is the battery voltage, trace 302 is the charging current and trace 303 is the oscillator frequency.

As seen at point C in FIG. 3, the beginning of charging, the charging current Ibat is at the maximum value Ichg as in the conventional charging profile in FIG. 2. As seen at point E in FIG. 3, as transistor 102 begins to increase in temperature, Ibat is reduced and thus the battery charges at a slower rate. As battery voltage Vbat comes up, power dissipation is decreasing and the initial dip in Ibat reverses, then it begins to rise back up. Once battery voltage Vbat reaches point D, the power dissipation has decreased to a level such that the charging current Ibat is again the maximum value Ichg as shown at point F. Once Vreg is reached, as seen at point B, charging current Ibat tapers down as in the conventional case. On the frequency axis, the oscillator frequency starts off at Fnom, but when the power dissipation causes the thermal regulation loop to take over, the frequency begins to drop off. The oscillator frequency decreases and reaches a minimum value at point G where the charging current That has also reached its minimum value. As such when the oscillator frequency is reduced, the D flip-flops are clocked at a slower rate, thus increasing MCT. The oscillator frequency slowly comes back up and when the charging current Ichg reaches is maximum value again at point F the oscillator has also returned to its original value of Fnom at point H. At this point the transistor temperature drops back down to a normal level and the frequency goes flat again as seen in FIG. 3, the oscillator is no longer slowed down. The exemplary embodiment of the present invention addresses many of the shortcomings of the prior art. The present invention may be described herein in terms of various functional components. It should be appreciated that such functional components may be realized by any number of hardware or structural components configured to perform the specified functions. For example, the present invention may employ various integrated components, such as the oscillator circuit block and the clock divider chain and the like, which are comprised of various electrical devices, such as resistors, transistors, capacitors, diodes and the like whose values may be suitably configured for various intended purposes. Additionally, the various components may be implemented in alternate ways, such as, for example, the changing of transistor devices from PMOS to NMOS transistors and the changing of the polarity of the circuits. These alternatives can be suitably selected depending upon the particular application or in consideration of any number of factors associated with the operation of the system. Such general applications that may be appreciated by those skilled in the art in light of the present disclosure are not described in detail herein. Further, it should be noted that while various components may be suitably coupled or connected to other components within the exemplary circuit, such connections and couplings can be realized either by direct connection between components, or by connection through other components and devices located there between. These and other changes or modifications are intended to be included within the scope of the present invention, as expressed in the following claims.

What is claimed is:

1. A circuit for dynamically adjusting the maximum charge time ("MCT") of a battery charger, comprising:
    a current regulation loop operable to regulate charging current to a battery under charge;
    a voltage regulation loop operable to sense the voltage across a battery under charge;
    a timing circuit being responsively coupled to the current regulation loop and the voltage regulation loop;
    a dynamic MCT implementation circuit responsively coupled to the timing circuit operable to adjust the rate of the timing circuit in response to varying charging operation parameters;
    a termination circuit being responsively coupled to the dynamic MCT implementation circuit;
    the dynamic MCT implementation circuit and timing circuit being operable to dynamically adjust the maximum charge time based on varying charging operation parameters; and
    the termination circuit operable to terminate the application of current to a battery under charge upon the occurrence of a maximum charge time.

2. The circuit for dynamically adjusting the maximum charge time of a battery charger of claim 1, wherein variable power dissipation and the voltage across the battery under charge operates to adjust the maximum charge time.

3. The circuit for dynamically adjusting the maximum charge time of a battery charger of claim 1, wherein the dynamic MCT implementation circuit and timing circuit are operable to dynamically adjust the maximum charge time based on, temperature parameters of one or a plurality of transistors used to regulate charging current to the battery under charge.

4. The circuit for dynamically adjusting the maximum charge time of a battery charger, of claim 1, wherein the maximum charge time is a function of the charging current.

5. The circuit for dynamically adjusting the maximum charge time of a battery charger of claim 4, wherein maximum charge time is increased during low current and decreased during high current.

6. The circuit for dynamically adjusting the maximum charge time of a battery charger of claim 1, wherein the dynamic MCT implementation circuit and timing circuit further comprises:

a first transistor;

a second transistor of opposite polarity from the first transistor;

the current regulation loop being responsively coupled to the gates of the first and second transistors;

an differential amplifier;

the drains of the first and second transistors being coupled to a first input of the differential amplifier;

the second input of the differential amplifier being coupled to a reference voltage;

a third transistor;

the output of the differential amplifier being responsively coupled to the gate of the third transistor;

an oscillator operable to accept a signal at its input;

a clock divider circuit operable to accept a signal at its input from the oscillator; and the third transistor being responsively coupled to the input of the oscillator.

7. The dynamic MCT implementation circuit and timing circuit of claim 6 further comprising the oscillator being a temperature controlled oscillator.

8. The dynamic MCT implementation circuit and timing circuit of claim 6 further comprising the oscillator being a voltage controlled oscillator.

9. The dynamic MCT implementation circuit and timing circuit of claim 6 further comprising the output of the clock divider circuit transitioning from a first state to a second state upon reaching maximum charge time.

10. The dynamic MCT implementation circuit and timing circuit of claim 6 being operable to adjust the maximum charge time parameter of a battery charging circuit as a function of the temperature of one or a plurality of transistors used to control current to the battery under charge.

11. The dynamic MCT implementation circuit and timing circuit of claim 6 being operable to adjust the maximum charge time parameter of a battery charging circuit as a function of current to the battery under charge.

12. The circuit for dynamically adjusting the maximum charge time of a battery charger, of claim 6 wherein the first, second and third transistors comprise MOS transistors.

13. The dynamic MCT implementation circuit and timing circuit of claim 6 further comprising the oscillator being a current controlled oscillator.

14. The circuit for dynamically adjusting the maximum charge time of a battery charger, of claim 13, wherein the current controlled oscillator and clock divider circuit are operable to output a disable signal upon reaching maximum charge time.

15. The circuit for dynamically adjusting the maximum charge time of a battery charger, of claim 14, wherein the current applied to the current controlled oscillator is proportional to battery charging current.

16. The circuit for dynamically adjusting the maximum charge time of a battery charger, of claim 14, wherein maximum charge time is the time integral of the current controlled oscillator.

17. The circuit for dynamically adjusting the maximum charge time of a battery charger, of claim 14, wherein the output of the clock divider circuit is operable to disable the charging current.

18. The circuit for dynamically adjusting the maximum charge time of a battery charger, of claim 14, wherein the dynamic MCT implementation circuit and timing circuit are operable to dynamically adjust the maximum charge time based on temperature parameters of one or a plurality of transistors used to regulate charging current to the battery under charge.

19. A circuit for sensing current and temperature levels of a power transistor and in response thereto controlling and terminating current to a load coupled to the power transistor, comprising:

a current regulation circuit being responsively coupled to the load;

a dynamic maximum charge time circuit being responsively coupled to the current regulation circuit;

a termination circuit for terminating current to the load upon the occurrence of a maximum charge time event;

the termination circuit being responsively coupled to the dynamic maximum charge time circuit; and the dynamic maximum charge time circuit being operable to adjust the timing of the maximum charge time event based on power dissipation and load parameters.

20. The circuit for sensing current and temperature levels of a power transistor and controlling current to a load coupled to the power transistor of claim 19, wherein the load comprises a battery.

21. The circuit for sensing current and temperature levels of a power transistor and controlling current to a load coupled to the power transistor of claim 19, further comprising increasing maximum charge time during low current and decreasing maximum charge time during high current.

22. The circuit for sensing current and temperature levels of a power transistor and controlling current to a load coupled to the power transistor of claim 19, further comprising the dynamic maximum charge time circuit operable to dynamically adjust the maximum charge time based on temperature parameters of one or a plurality of transistors used to regulate charging current to the battery under charge.

23. A battery charger circuit with a first circuit for enabling the application of current to a battery, a second circuit for sensing the voltage across the battery, and a third circuit for regulating and terminating the charging current to the battery, comprising a dynamic MCT circuit operable to adjust the maximum charge time during which charging current is applied to a battery.

24. The battery charger circuit of claim 23, further comprising a termination circuit operable to terminate the application of current to the battery upon occurrence of maximum charge time as enabled by the dynamic MCT circuit.

25. A circuit for dynamically adjusting current to a load, comprising:

a current regulation loop operable to regulate current to a load;

a voltage regulation loop operable to sense the voltage across the load;

a timing circuit being responsively coupled to the current regulation loop and the voltage regulation loop;

a dynamic MCT implementation circuit responsively coupled to the timing circuit operable to adjust the rate of the timing circuit in response to varying load parameters;

a termination circuit being responsively coupled to the dynamic MCT implementation circuit;

the dynamic MCT implementation circuit and timing circuit being operable to dynamically adjust the current to a load based on varying parameters; and the termination circuit operable to terminate the application of current to a load upon the occurrence of a maximum charge time.

26. The circuit for dynamically adjusting the current to a load of claim 25, wherein variable power dissipation and the voltage across the load operates to adjust the maximum charge time.

27. The circuit for dynamically adjusting the current to a load of claim 25, wherein the dynamic MCT implementation circuit and timing circuit are operable to dynamically adjust the current to a load based on temperature parameters of one or a plurality of devices or transistors used to regulate current to the load.

28. The circuit for dynamically adjusting the current to a load of claim 25, wherein the maximum charge time is a function of the charging current.

29. The circuit for dynamically adjusting the current to a load of claim 28, wherein maximum charge time is increased during low current to the load and decreased during high current to the load.

30. The circuit for dynamically adjusting the current to a load of claim 25, wherein the dynamic MCT implementation circuit and timing circuit further comprises:
- a first transistor;
- a second transistor of opposite polarity from the first transistor;
- the current regulation loop being responsively coupled to the gates of the first and second transistors;
- an differential amplifier;
- the drains of the first and second transistors being coupled to a first input of the differential amplifier;
- the second input of the differential amplifier being coupled to a reference voltage;
- a third transistor;
- the output of the differential amplifier being responsively coupled to the gate of the third transistor;
- an oscillator operable to accept a signal at its input;
- a clock divider circuit operable to accept a signal at its input from the oscillator; and
- the third transistor being responsively coupled to the input of the oscillator.

31. A circuit for dynamically adjusting current to a load based on the temperature of devices within the circuit, comprising:
- a current regulation loop operable to regulate current to a load as a function of the temperature of devices within the circuit;
- a voltage regulation loop operable to sense the voltage across the load as a function of the temperature of devices within the circuit;
- a timing circuit being responsively coupled to the current regulation loop and the voltage regulation loop;
- a dynamic MCT implementation circuit responsively coupled to the timing circuit operable to adjust the rate of the timing circuit in response to varying load parameters which are a function of the temperature of devices within the circuit;
- a termination circuit being responsively coupled to the dynamic MCT implementation circuit;
- the dynamic MCT implementation circuit and timing circuit being operable to dynamically adjust the current to a load based on varying parameters which are a function of the temperature of devices within the circuit; and
- the termination circuit operable to terminate the application of current to a load upon the occurrence of a maximum charge time.

32. The circuit for dynamically adjusting the current to a load based on the temperature of devices within the circuit of claim 31, wherein the devices comprise power transistors.

33. The circuit for dynamically adjusting the current to a load based on the temperature of devices within the circuit of claim 31, wherein variable power dissipation of the devices and the voltage across the load operates to adjust the maximum charge time.

34. The circuit for dynamically adjusting the current to a load based on the temperature of devices within the circuit of claim 31, wherein the dynamic MCT implementation circuit and timing circuit are operable to dynamically adjust the current to a load based on temperature parameters of one or a plurality of devices or transistors used to regulate current to the load.

35. The circuit for dynamically adjusting the current to a load based on the temperature of devices within the circuit of claim 31, wherein the maximum charge time is a function of the charging current.

36. The circuit for dynamically adjusting the current to a load based on the temperature of devices within the circuit of claim 31, wherein maximum charge time is increased during low current to the load and low device temperature and decreased during high current to the load and high device temperature.

37. The circuit for dynamically adjusting the current to a load based on the temperature of devices within the circuit of claim 31, wherein the dynamic MCT implementation circuit and timing circuit further comprises:
- a first transistor;
- a second transistor of opposite polarity from the first transistor;
- the current regulation loop being responsively coupled to the gates of the first and second transistors;
- an differential amplifier;
- the drains of the first and second transistors being coupled to a first input of the differential amplifier;
- the second input of the differential amplifier being coupled to a reference voltage;
- a third transistor;
- the output of the differential amplifier being responsively coupled to the gate of the third transistor;
- an oscillator operable to accept a signal at its input;
- a clock divider circuit operable to accept a signal at its input from the oscillator; and
- the third transistor being responsively coupled to the input of the oscillator.

38. A method of controlling a current to a load, comprising:
- dynamically adjusting current based on operating parameters;
- contemporaneously therewith, adjusting the parameter of maximum charge time; and
- terminating current to a load upon the occurrence of maximum charge time.

39. The method of controlling a current to a load of claim 38, further comprising:
- the load comprising a battery under charge; and
- the operating parameters being the status of the battery under charge.

40. The method of controlling a current to a load of claim 38, further comprising:
- the load operating parameters being the temperature of devices within the circuit controlling the current to the load.

41. A method of controlling current to a battery under charge, comprising:
- dynamically adjusting current based on battery charging parameters;
- contemporaneously therewith, adjusting the parameter of maximum charge time; and
- terminating current to the battery under charge upon the occurrence of maximum charge time.

42. The method of controlling current to a battery under charge of claim 41, further comprising:
- determining the maximum charge time based upon power dissipation parameters.

43. The method of controlling current to a battery under charge of claim 41, further comprising determining the maximum charge time based upon battery voltage parameters.

44. The method of controlling current to a battery under charge of claim 41, further comprising determining the maximum charge time based upon the temperature of the circuit.

45. The method of controlling current to a battery under charge of claim 41, further comprising increasing MCT during low current and decreasing MCT during high current.

46. The method of controlling current to a battery under charge of claim 41, further comprising determining the maximum charge time based upon battery current parameters.

* * * * *